United States Patent

Gabriel et al.

[19]

[11] Patent Number: 6,161,119
[45] Date of Patent: Dec. 12, 2000

[54] HARDWARE MULTIPLICATION OF SCALED INTEGERS

[75] Inventors: Steven Allen Gabriel, Redmond; James F. Blinn, Bellevue, both of Wash.

[73] Assignee: Microsoft Corporation, Redmond, Wash.

[21] Appl. No.: 09/186,965

[22] Filed: Nov. 5, 1998

[51] Int. Cl.[7] .................................. G06F 7/38; G06F 7/52
[52] U.S. Cl. ............................................. 708/551; 708/620
[58] Field of Search ........................................ 708/620, 551, 708/550, 496–497

[56] References Cited

U.S. PATENT DOCUMENTS

| | | | |
|---|---|---|---|
| 5,041,998 | 8/1991 | Lawrence et al. | 364/715.1 |
| 5,173,948 | 12/1992 | Blackham et al. | 382/44 |
| 5,463,570 | 10/1995 | Nakata | 708/551 |
| 5,671,171 | 9/1997 | Yu et al. | 708/500 |
| 5,696,710 | 12/1997 | Hague et al. | 708/551 |
| 5,909,385 | 6/1999 | Nishiyama et al. | 708/497 |

OTHER PUBLICATIONS

Blinn, James F., "Three Wrongs Make A Right", "IEEE Computer Graphics and Applications", Nov. 1995, vol. 15, No. 6, pp. 90–93.

*Primary Examiner*—Tan V. Mai
*Attorney, Agent, or Firm*—Lee & Hayes, PLLC

[57] ABSTRACT

A scaling multiplier circuit in accordance with the invention includes a multiplier circuit, a carry calculation circuit, a logic circuit, and an adder circuit. The multiplier circuit produces a 16-bit product of two 8-bit input numbers. The 16-bit product has bits m(15:0). The carry calculation circuit produces a first carryout bit from a sum of a first number consisting of bits m(6:0), a second number consisting of bits m(14:8), and a third number consisting of bit m(7). The logic circuit produces intermediate carryout bits from a sum of bit m(7m), m(15), the first carryout bit, and a constant bit having a value of "1". The adder circuit produces the actual scaled product by summing the intermediate carryout bits and a fourth number consisting of bits m(15:8).

20 Claims, 2 Drawing Sheets

HARDWARE MULTIPLICATION OF SCALED INTEGERS

TECHNICAL FIELD

This invention relates to circuits for multiplying two scaled integers to produce a scaled integer product.

BACKGROUND OF THE INVENTION

Computer graphics operations and components typically use scaled integers to represent fractional values. In an RGB color system, for example, the color of a particular pixel is represented as a scaled R (red) value, a scaled G (green) value, and a scaled B (blue) value. Technically, the full range of intensities for a particular color component ranges from 0 to 1, with intermediate intensities being represented by floating point values between 0.0 and 1.0. In actual implementation, however, it is much more convenient to use scaled integer values to represent these floating point numbers. Thus, when using so-called 24-bit color values, each RGB value is an 8-bit integer ranging from 0 to 255. A 0 value represents the lowest possible intensity of a particular color component (0.0), and a value of 255 represents a fully saturated color component (1.0). Intermediate values represent intensities that are fractions of the fill intensity.

Mathematically, the actual floating point intensity f is equal to i/s, where i is the integer representation of the intensity and s is a scaling factor. In the typical case where 1.0 is represented by the maximum possible value of an integer value, the scaling factor is equal to this maximum possible value. Thus, in the example above, the scaling factor is 255.

When performing graphics operations, there are many situations that require multiplying the intensity components of two different pixel values. Image compositing, blending, and antialiasing are examples of graphics operations that require pixel multiplication.

The scaled product r of two scaled integers a and b is equal to ab/s. The result of this calculation is rounded to obtain the nearest integer. A convenient way to perform such rounding is to add 0.5 to the result and truncate: r=trunc(ab/s+0.5), where "trunc" represents the truncation operator. To avoid floating point calculations, this can be rearranged as r=trunc[(ab+s/2)/s].

For 8-bit values of a and b, one of the inventors has previously demonstrated a method of multiplying scaled integers that is particularly efficient when using a computer or other programmable data processor to perform the calculations. This method was disclosed in *Three Wrongs Make a Right* ("IEEE Computer Graphics and Applications", November 1995, Volume 15, Number 6, pp. 90–93), which is hereby incorporated by reference. In accordance with this method, r=(i+(i>>8))>>8; where i=ab+128. The operator ">>" indicates a right-shift operation; ">>8" indicates a right-shift by 8 bits.

Using 80x86 assembly code, the operation above is performed most efficiently as follows:

```
mov   al,a       ;load a
mul   b          ;multiply by b
add   ax,0x80    ;add bias
add   al,ah      ;add ah to al
adc   ah,0       ;carry into ah
mov   r,ah       ;store result
```

Although this assembly code represents an efficient programmed implementation of the equation r=(i+(i>>8))>>8, the inventors have recognized a need for a hardware implementation. Such a hardware implementation is needed in order to perform even more efficient graphics operations in conjunction with pixels represented by scaled integers. The particular hardware implementation described and claimed below is particularly efficient in terms of the number of electronic gates and components utilized.

SUMMARY OF THE INVENTION

The invention embodiment described below uses a multiplier to produce an initial, unscaled product of two 8-bit input scaled numbers. A carry calculation circuit adds three numbers to produce a first carryout bit. The three numbers comprise a number formed by bits 0 through 6 of the unscaled product; a number formed by bits 8 through 14 of the unscaled product; and a number formed by bit 7 of the unscaled product. The carry calculation circuit uses seven majority gates, each of which calculates a carry based on a summation of three input bits.

A logic circuit produces first and second intermediate carryout bits based on a summation of three bits: bit 7 of the unscaled product; bit 15 of the unscaled product, the first carryout bit, and a constant bit having a value of "1". The logic circuit is implemented with a three-input AND gate and a three-input OR gate.

An adder circuit produces the actual scaled product. It does this by summing three values: the first and second intermediate carryout bits and a number formed by bits 8 through 15 of the unscaled product. The adder circuit has eight single-bit stages. One of these stages (the lowest order stage) is a full adder circuit, while the other stages are half adder circuits.

DETAILED DESCRIPTION

Figure 1:
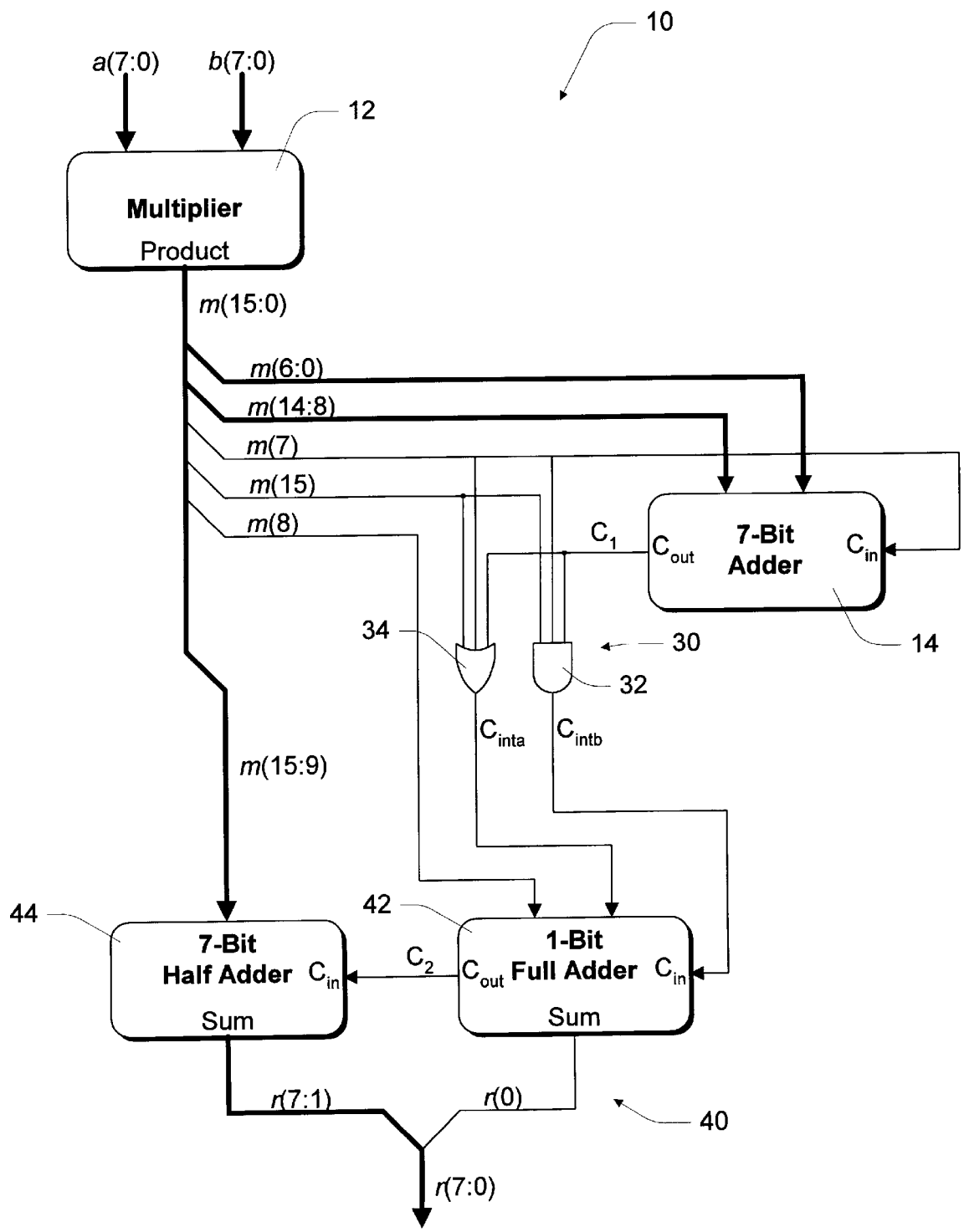
FIG. 1 is schematic diagram of a scaling multiplier circuit for producing an 8-bit scaled product of two 8-bit scaled numbers.

FIG. 1 shows a hardware implementation 10 for producing a scaled integer product r of two scaled integers a and b. In this embodiment, the multiplicand a, the multiplier b, and the product r are all 8-bit, unsigned integers, having bits 0 through 7 and having scaled values in the range of 0–255. Integers a, b, and r represent values in the range of 0.0 to 1.0. Thus, each value is scaled by a scaling factor s which is equal to 255.

Scaling multiplier circuit 10 implements the operation r=trunc[(ab+s/2)s]. As discussed above, this is equivalent to r=ab/s or r=trunc(ab/s+0.5). More particularly, hardware circuit 10 implements the operation r=(i+(i>>8))>>8; where i=ab+128. The implementation described herein uses a very small number of components as compared to a conventional implementation.

In FIG. 1, bolded lines indicate signals comprising a plurality of bits. The particular bits are indicated by the nomenclature (k:l), indicating a range of bits from bit l to bit k of the associated integer, where the lowest-order bit is bit 0. Thus, m(14:8) indicates bits 8 through 14 of value m. Non-bolded lines indicate single bits, with the bit numbers represented in parentheses following a variable name. Thus, m(15) indicates bit 15 of value m.

Hardware circuit 10 includes means for calculating a 16-bit product of the two 8-bit input numbers a and b. Such means comprises a multiplier circuit 12 that receives the integers a and b, shown in FIG. 1 as a(7:0) and b(7:0), and produces an unscaled product m, shown as m(15:0). As indicated, the product has 16 bits, from the lowest order bit 0 to the highest order bit 15. Thus, these bits are referred herein as bits m(0) through m(15) or simply as bits m(15:0). More generally, multiplier circuit 12 produces a product m having bits 0 through 2N+1, where the input integers a and b each have bits 0 through N.

Hardware circuit 10 further includes means for calculating a first carryout bit $C_1$ from a sum of three numbers. Such means comprises a carry calculator or carry calculation circuit 14 that receives a first integer number consisting of bits m(6:0) (bits 0 through N−1) and a second integer number consisting of bits m(24:8) (bits N+1 through 2N). Carry calculation circuit also receives a carryin signal $C_{in}$, formed by a number consisting of the single bit m(7) (bit N).

Carry calculation circuit 14 can be a conventional 7-bit full adder circuit. However, only the carry bits are used since the circuit is not required to produce a sum. Any gates within the adder circuit that are used exclusively to generate a sum can be omitted from the circuit.

Figure 2:
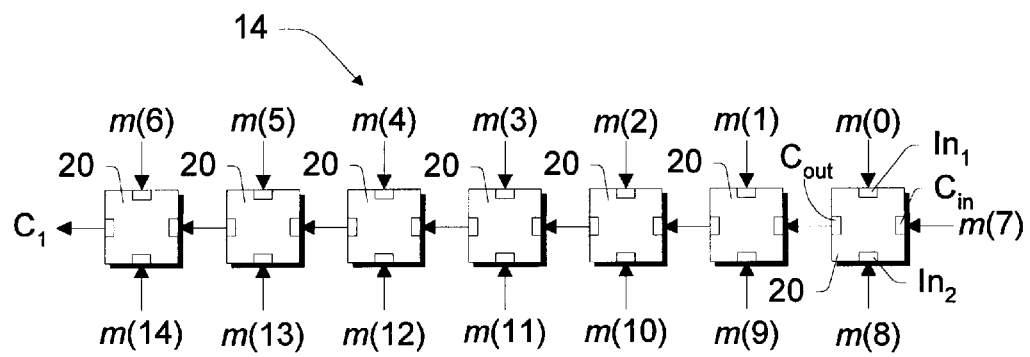
FIG. 2 is a schematic diagram of a carry calculation circuit as implemented in accordance with the described embodiment of the invention.

FIG. 2 shows one implementation of carry calculation circuit 14. It has seven stages 20, each of which comprises a carry calculation stage of a conventional ripple adder. Such a carry calculation stage is called a majority gate. It has inputs $In_1$ and $In_2$ for two single-bit addends, and a third input $C_{in}$ for a carryin bit. It has a single output $C_{out}$ representing a carryout, which is produced according to the equation $C_{out}=In_1$ & $In_2|In_1$ & $C_{in}|In_2$ & $C_{in}$. Thus, the output $C_{out}$ is equal to binary "0" when no more than one of the three inputs $In_1$, $In_2$ and $C_{in}$ are equal to binary "1". In all other cases, when more than one of the three inputs is set, the carryout output is equal to binary "1". Majority gates 20 are connected in series, with the carryout output of a lower order stage being connected to the carryin input of a higher order stage.

Returning to FIG. 1, hardware circuit 10 has means for calculating intermediate carryout bits from a sum of bit m(7), bit m(15), the first carryout bit $C_1$, and a constant bit having a value of binary "1". Such means comprises a logic circuit 30 that produces intermediate carryout bits $C_{inta}$ and $C_{intb}$, where $C_{inta}$ and $C_{intb}$ represent a carryout value $C_{int}$ resulting from the summation of bit m(7), m(15), $C_1$, and a constant bit having a value of binary "1", and where the summation produces only a single-bit result.

Table 1 below shows the possible combinations of input values into logic circuit 30, and the resulting sums, single-bit sums, and carryout values.

TABLE 1

|   | m(7) | m(15) | $C_1$ | 1 | Sum (binary) | Single-Bit Sum | Carry $C_{int}$ (decimal) |
|---|------|-------|-------|---|--------------|----------------|---------------------------|
| 1 | 0    | 0     | 0     | 1 | 001          | 1              | 0                         |
| 2 | 0    | 0     | 1     | 1 | 010          | 0              | 1                         |
| 3 | 0    | 1     | 0     | 1 | 010          | 0              | 1                         |
| 4 | 0    | 1     | 1     | 1 | 011          | 1              | 1                         |
| 5 | 1    | 0     | 0     | 1 | 010          | 0              | 1                         |
| 6 | 1    | 0     | 1     | 1 | 011          | 1              | 1                         |
| 7 | 1    | 1     | 0     | 1 | 011          | 1              | 1                         |
| 8 | 1    | 1     | 1     | 1 | 100          | 0              | 2                         |

Because $C_{int}$ ranges from 0 to 2, it is represented by two bits: $C_{inta}$ and $C_{intb}$. These bits can be used to form a single 2-bit binary value or to form two 1-bit values. In the described embodiment, $C_{inta}$ and $C_{intb}$ are two 1-bit values that are summed to represent the three possible values of $C_{int}$. Specifically, $C_{inta}$ and $C_{intb}$ are generated such that (a) both of them are "0" for the conditions represented by row 1 of Table 1; (b) exactly one of them is "1" for the conditions represented by rows 2–7 of Table 1; and (c) both of them are "1" (to yield a sum of "2") for the conditions represented by row 8 of Table 1. There are several ways to do this. Table 2 shows how it is done in the embodiment described herein.

TABLE 2

| m(7) | m(15 | $C_1$ | $C_{inta}$ | $C_{intb}$ |
|------|------|-------|------------|------------|
| 0    | 0    | 0     | 0          | 0          |
| 0    | 0    | 1     | 1          | 0          |
| 0    | 1    | 0     | 1          | 0          |
| 0    | 1    | 1     | 1          | 0          |
| 1    | 0    | 0     | 1          | 0          |
| 1    | 0    | 1     | 1          | 0          |
| 1    | 1    | 0     | 1          | 0          |
| 1    | 1    | 1     | 1          | 1          |

Thus, $C_{inta}$=m(7)|m(15)|$C_1$, and $C_{intb}$=m(7) & m(15) & $C_1$, where "|" represents a logical OR operation, and "&" represents a logical AND operation.

In the hardware implementation of FIG. 1, logic circuit 30 comprises a 3-input AND gate 32 and a 3-input OR gate 34. The inputs of the AND gate are connected to receive bit m(7) (bit 2N), bit m(15) (bit 2N+1), and the first carryout bit $C_1$. AND gate 32 performs a function of logically ANDing these inputs to produce $C_{intb}$. The inputs of the OR gate are similarly connected to receive bit m(7) (bit 2N), bit m(15) (bit 2N+1), and the first carryout bit $C_1$. OR gate 34 performs a function of logically ORing these inputs to produce $C_{inta}$.

Scaled multiplier 10 further comprises means for summing intermediate carryout bits $C_{inta}$ and $C_{intb}$ and a number consisting of bits m(15:8) (bits N+1 through 2N+1) of unscaled product m, to produce the 8-bit scaled product r. Such means comprise an adder circuit 40, which in turn comprises a 1-bit full adder circuit 42 and a 7-bit adder circuit 44. The 1-bit full adder circuit 42 performs a function of summing bit m(8) (bit N+1) and intermediate carryout bits $C_{inta}$ and $C_{intb}$ to produce a second carryout bit $C_2$ and to produce the least significant bit r(0) of the scaled product r. The 7-bit adder circuit performs a function of summing the second carryout bit $C_2$ and a number consisting of bits r(15:9) to produce the most significant bits r(7:1) of the scaled product.

Figure 3:
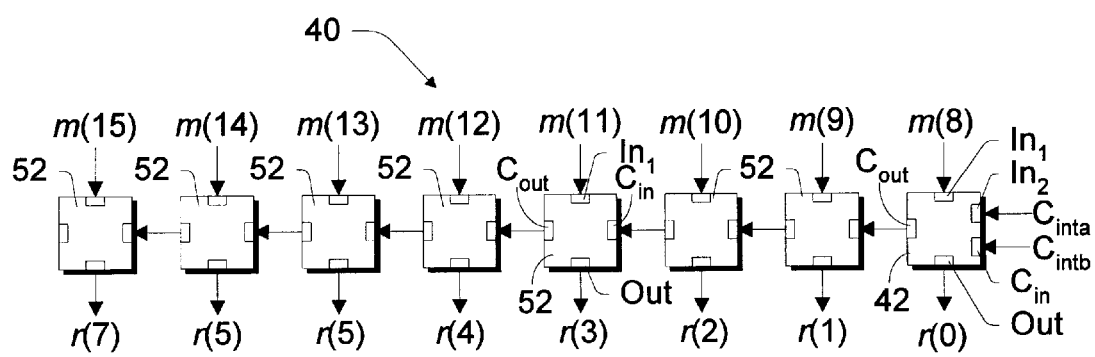
FIG. 3 is a schematic diagram of an adder circuit as implemented in accordance with the described embodiment of the invention.

FIG. 3 shows this implementation of adder circuit 40, comprising a full adder stage 42 and seven half adder stages 52, connected to receive $C_{inta}$ and $C_{intb}$ and bits m(15:8), and to produce result bits r(7:0), which form the eight bits of scaled product r.

Full adder stage 42 is a conventional ripple adder stage having addend inputs $In_1$, and $In_2$, and a carryin bit input $C_{in}$. These three bit inputs are summed to produce a sum bit Out and a carryout bit $C_{out}$. Each half adder stage 52 has an input $In_1$ and a carryin bit input $C_{in}$. These two inputs are summed to produce a sum bit Out and a carryout bit $C_{out}$. The carryout bit of a particular stage is connected to one of the inputs of the next higher stage. The carryout bit of the highest-order stage is not used.

As should be apparent, the hardware implementation described above requires far fewer components than would be used in a straightforward implementation of the equations i=ab+128 and r=(i+(i>>8))>>8. Yet this circuit has been demonstrated to provide accurate results for 8-bit inputs.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A scaling multiplier circuit for producing an 8-bit scaled product of two 8-bit numbers, comprising:
    a multiplier circuit that produces a 16-bit product of the two 8-bit numbers, the 16-bit product having bits referred to herein as bits m(15:0);
    a carry calculation circuit that produces a first carryout bit from a sum of a first number consisting of bits m(6:0), a second number consisting of bits m(14:8), and a third number consisting of bit m(7);
    a logic circuit that produces intermediate carryout bits from a sum of bit m(7), bit m(15), the first carryout bit, and a constant bit having a value of "1";
    an adder circuit that produces the scaled product by summing the intermediate carryout bits and a fourth number consisting of bits m(15:8).

2. A scaling multiplier circuit as recited in claim 1, the logic circuit comprising:
    a 3-input AND gate;
    a 3-input OR gate;
    the inputs of the AND gate being connected to receive bit m(7), bit m(15), and the first carryout bit;
    the inputs of the OR gate being connected to receive bit m(7), bit m(15), and the first carryout bit.

3. A scaling multiplier circuit as recited in claim 1, wherein the logic circuit has inputs connected to receive bit m(7), bit m(15), and the first carryout bit.

4. A scaling multiplier circuit as recited in claim 1, the adder circuit comprising:
    a 1-bit full adder circuit that sums bit m(8), and the intermediate carryout bits to produce a second carryout bit and the least significant bit of the scaled product;
    a 7-bit adder circuit that sums the second carryout bit and a fifth number consisting of bits m(15:9) to produce the most significant bits of the scaled product.

5. A scaling multiplier circuit as recited in claim 1, wherein the intermediate carryout bits comprise two 1-bit values that are summed by the adder circuit.

6. A scaling component for scaling a 16-bit product to produce an 8-bit scaled product, the 16-bit product having bits referred to herein as bits m(15:0), comprising:
    a carry calculator that produces a first carryout bit from a sum of a first number consisting of bits m(6:0), a second number consisting of bits m(14:8), and a third number consisting of bit m(7);
    logic that produces intermediate carryout bits from a sum of bit m(7), bit m(15), the first carryout bit, and a constant bit having a value of "1";
    an adder that produces the scaled product by summing the intermediate carryout bits and a fourth number consisting of bits m(15:8).

7. A scaling component as recited in claim 6, the logic comprising:
    a 3-input AND gate;
    a 3-input OR gate;
    the inputs of the AND gate being connected to receive m(7), bit m(15), and the first carryout bit;
    the inputs of the OR gate being connected to receive bit m(7), bit m(15), and the first carryout bit.

8. A scaling component as recited in claim 6, wherein the logic has inputs connected to receive bit m(7), bit m(15), and the first carryout bit.

9. A scaling component as recited in claim 6, the adder comprising:
    a 1-bit full adder that sums bit m(8) and the intermediate carryout bits to produce a second carryout bit and the least significant bit of the scaled product;
    a 7-bit adder that sums the second carryout bit and a fifth number consisting of bits m(15:9) to produce the most significant bits of the scaled product.

10. A scaling component circuit as recited in claim 6, wherein the intermediate carryout bits comprise two 1-bit values that are summed by the adder circuit.

11. A scaling multiplier for producing an 8-bit scaled product of two 8-bit numbers, comprising:
    means for calculating a 16-bit product of the two 8-bit numbers, the 16-bit product having bits referred to herein as bits m(15:0);
    means for calculating a first carryout bit from a sum of a first number consisting of bits m(6:0), a second number consisting of bits m(14:8), and a third number consisting of bit m(7);
    means for calculating intermediate carryout bits from a sum of bit m(7), bit m(15), the first carryout bit, and a constant bit having a value of "1";
    means for summing the intermediate carryout bits and a fourth number consisting of bits m(15:8) to produce the 8-bit scaled product.

12. A scaling multiplier as recited in claim 11, the means for calculating intermediate carryout bits comprising:
    means for logically ANDing bit m(7), bit m(15), and the first carryout bit; and
    means for logically ORing bit m(7), bit m(15), and the first carryout bit.

13. A scaling multiplier as recited in claim 11, wherein the means for calculating intermediate carryout bits has inputs connected to receive bit m(7), bit m(15), and the first carryout bit.

14. A scaling multiplier as recited in claim 11, wherein the means for summing the intermediate carryout bits and the fourth number comprises:
    means for summing bit m(8) and the intermediate carryout bits to produce a second carryout bit and the least significant bit of the scaled product;
    means for summing the second carryout bit and a fifth number consisting of bits m(15:9) to produce the most significant bits of the scaled product.

15. A scaling multiplier as recited in claim 11, wherein the intermediate carryout bits comprise two 1-bit values that are summed by the adder circuit.

16. A scaling multiplier circuit for producing a scaled product of two input numbers having bits 0 through N, comprising:
- a multiplier circuit that produces an unscaled product of the two input numbers;
- a carry calculation circuit that produces a first carryout bit from a sum of a first number consisting of bits 0 through N−1 of the unscaled product, a second number consisting of bits N+1 through 2N of the unscaled product, and a third number consisting bit N of the unscaled product;
- a logic circuit that produces intermediate carryout bits from a sum of bit N of the unscaled product, bit 2N+1 of the unscaled product, the first carryout bit, and a constant bit having a value of "1";
- an adder circuit that produces the scaled product by summing the intermediate carryout bits and a fourth number consisting of bits N+1 through 2N+1 of the unscaled product.

17. A scaling multiplier circuit as recited in claim 16, the logic circuit comprising:
- a 3-input AND gate;
- a 3-input OR gate;
- the inputs of the AND gate being connected to receive bit N of the unscaled product, bit 2N+1 of the unscaled product, and the first carryout bit; the inputs of the OR gate being connected to receive bit N of the unscaled product, bit 2N+1 of the unscaled product, and the first carryout bit.

18. A scaling multiplier circuit as recited in claim 16, wherein the logic circuit has inputs connected to receive bit N of the unscaled product, bit 2N+1 of the unscaled product, and the first carryout bit.

19. A scaling multiplier circuit as recited in claim 16, the adder circuit comprising:
- a 1-bit full adder that sums bit N+1 and the intermediate carryout bits to produce a second carryout bit and the least significant bit of the scaled product;
- a N-bit adder that sums the second carryout bit and a fifth number consisting of bits N−2 through 2N+1 of the unscaled product to produce the most significant bits of the scaled product.

20. A scaling multiplier circuit as recited in claim 16, wherein the intermediate carryout bits comprise two 1-bit values that are summed by the adder circuit.

* * * * *

UNITED STATES PATENT AND TRADEMARK OFFICE
CERTIFICATE OF CORRECTION

PATENT NO : 6,161,119
DATED : Dec. 12, 2000
INVENTOR(S) : Steven Allen Gabriel et al.

It is certified that error appears in the above-identified patent and that said Letters Patent are hereby corrected as shown below:

On the title page, in [57] ABSTRACT, change "m(7m), " to --m(7)--.

Column 1, line 26, change "fill" to --full--.

Signed and Sealed this

Twenty-ninth Day of May, 2001

NICHOLAS P. GODICI

*Attest:*

*Attesting Officer*     Acting Director of the United States Patent and Trademark Office